(12) United States Patent
Sarkar et al.

(10) Patent No.: US 9,442,716 B2
(45) Date of Patent: Sep. 13, 2016

(54) METHODS AND APPARATUS FOR ADJUSTING A VARIABLE RATE OF REQUESTING SOFTWARE DATA FROM A VEHICLE

(71) Applicant: GM GLOBAL TECHNOLOGY OPERATIONS LLC, Detroit, MI (US)

(72) Inventors: Susanta P. Sarkar, Rochester Hills, MI (US); Jonathan R. Schwarz, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 14/034,752

(22) Filed: Sep. 24, 2013

(65) Prior Publication Data
US 2015/0089489 A1   Mar. 26, 2015

(51) Int. Cl.
G06F 9/455 (2006.01)
G06F 9/445 (2006.01)
H04L 29/08 (2006.01)

(52) U.S. Cl.
CPC . *G06F 8/67* (2013.01); *G06F 8/65* (2013.01); *H04L 67/12* (2013.01)

(58) Field of Classification Search
CPC .............. G06F 8/67; G06F 8/65; H04L 67/12
See application file for complete search history.

(56) References Cited

U.S. PATENT DOCUMENTS

| | | | |
|---|---|---|---|
| 2005/0129010 A1* | 6/2005 | Maeda et al. | 370/389 |
| 2005/0216903 A1* | 9/2005 | Schaefer | G07C 5/008 717/168 |
| 2005/0256614 A1* | 11/2005 | Habermas | G06F 8/65 701/1 |
| 2009/0125897 A1* | 5/2009 | Matlin et al. | 717/168 |
| 2009/0184579 A1* | 7/2009 | Owens et al. | 307/10.7 |
| 2009/0300595 A1* | 12/2009 | Moran | G06F 8/65 717/170 |
| 2011/0289495 A1* | 11/2011 | Mulligan | G06F 8/61 717/168 |
| 2011/0307882 A1* | 12/2011 | Shiba | 717/173 |
| 2013/0138604 A1* | 5/2013 | Ozawa et al. | 707/609 |
| 2014/0235262 A1* | 8/2014 | Cho | H04W 28/0247 455/453 |

* cited by examiner

*Primary Examiner* — Lewis A Bullock, Jr.
*Assistant Examiner* — Jacob Dascomb
(74) *Attorney, Agent, or Firm* — Lorenz & Kopf, LLP

(57) ABSTRACT

A method for adjusting a variable rate of requesting software data for a computer system onboard a vehicle is provided. The method determines a number of ignition cycles executed after first software data has been retrieved; and when the number of ignition cycles is greater than a threshold value, reduces a frequency for generating a software request, to obtain a reduced frequency.

20 Claims, 4 Drawing Sheets

METHODS AND APPARATUS FOR ADJUSTING A VARIABLE RATE OF REQUESTING SOFTWARE DATA FROM A VEHICLE

TECHNICAL FIELD

Embodiments of the subject matter described herein relate generally to software retrieval for a vehicle onboard computer system. More particularly, embodiments of the subject matter relate to adjusting a variable rate for requesting software data for download at a vehicle onboard computer system.

BACKGROUND

Vehicles are increasingly equipped with onboard computer systems that provide information, entertainment, and system management capabilities. In order to keep up with new software based technologies and features, and to realize the most up-to-date functionality for the internal systems of a vehicle, it is necessary to periodically download relevant software at a vehicle. A vehicle onboard computer system may communicate with a remote server to request a software download and, if available, to obtain and utilize the software at the vehicle onboard computer system.

Generally, vehicles do not maintain a continuous communication connection to the remote server and are unaware as to the availability of a necessary software download. An autonomous algorithmic decision must be made to determine how often a vehicle should request a software download, such as a software update. Software updates are necessary more often when a vehicle is newer or when a vehicle has recently downloaded additional software. During initial launch of a vehicle and subsequent to an update, frequent requests for additional software are necessary as errors may need to be corrected. However, older vehicles and/or vehicles that have not downloaded new or updated software in a substantial period of time may not require additional software downloads, except in rare instances. It is not advisable to stop checking for software downloads, as a rare but important software update may be missed. On the other hand, if vehicles with mature software continue to request software downloads according to the same schedule that was programmed into the vehicle when it was new, this considerable amount of unnecessary software download requests may consume substantial resources, including wireless communication bandwidth and remote server processing cycles.

Accordingly, it is desirable to reduce the number of software update requests that a server receives at any given time. Furthermore, other desirable features and characteristics will become apparent from the subsequent detailed description and the appended claims, taken in conjunction with the accompanying drawings and the foregoing technical field and background.

BRIEF SUMMARY

Some embodiments provide a method for adjusting a variable rate of requesting software data for a computer system onboard a vehicle. The method determines a number of ignition cycles executed after first software data has been retrieved; and when the number of ignition cycles is greater than a threshold value, reduces a frequency for generating a software request, to obtain a reduced frequency.

Some embodiments provide a system for adjusting a variable rate of requesting software updates onboard a vehicle. The system includes a communication module, configured to request and receive software updates for a vehicle onboard computer system; control logic, configured to determine a number of ignition cycles executed after a first software update is performed; and a software update scheduling module, configured to reduce a frequency of requesting software updates when the number of ignition cycles is greater than a threshold.

Some embodiments provide a non-transitory, computer-readable storage medium containing instructions stored thereon, wherein, when executed by a processor, the instructions cause the processor to perform a method for adjusting a variable rate of vehicle onboard requests for software updates. The method determines whether a vehicle onboard software update was performed before a vehicle was shut down, wherein the vehicle utilizes an update request schedule comprising a default frequency; and when a vehicle onboard software update was not performed before the vehicle was shut down, implements an update request schedule comprising a reduced frequency.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used to adjust a variable rate of requesting software downloads from a remote server for a vehicle onboard computer system. In some embodiments, the vehicle onboard computer system requests software downloads at a predetermined, periodic frequency. In some embodiments, the variable rate of requesting software downloads is decreased at ignition time based on whether a software download was performed before the vehicle was powered down. In some embodiments, the variable rate of requesting software downloads is decreased based on the age of the vehicle and/or the length of time that has passed since the last software download was received at the vehicle. This vehicle age and/or time since last download may be determined by a number of executed ignition cycles, mileage values, time and/or date values, maintenance data, or the like.

Figure 1:
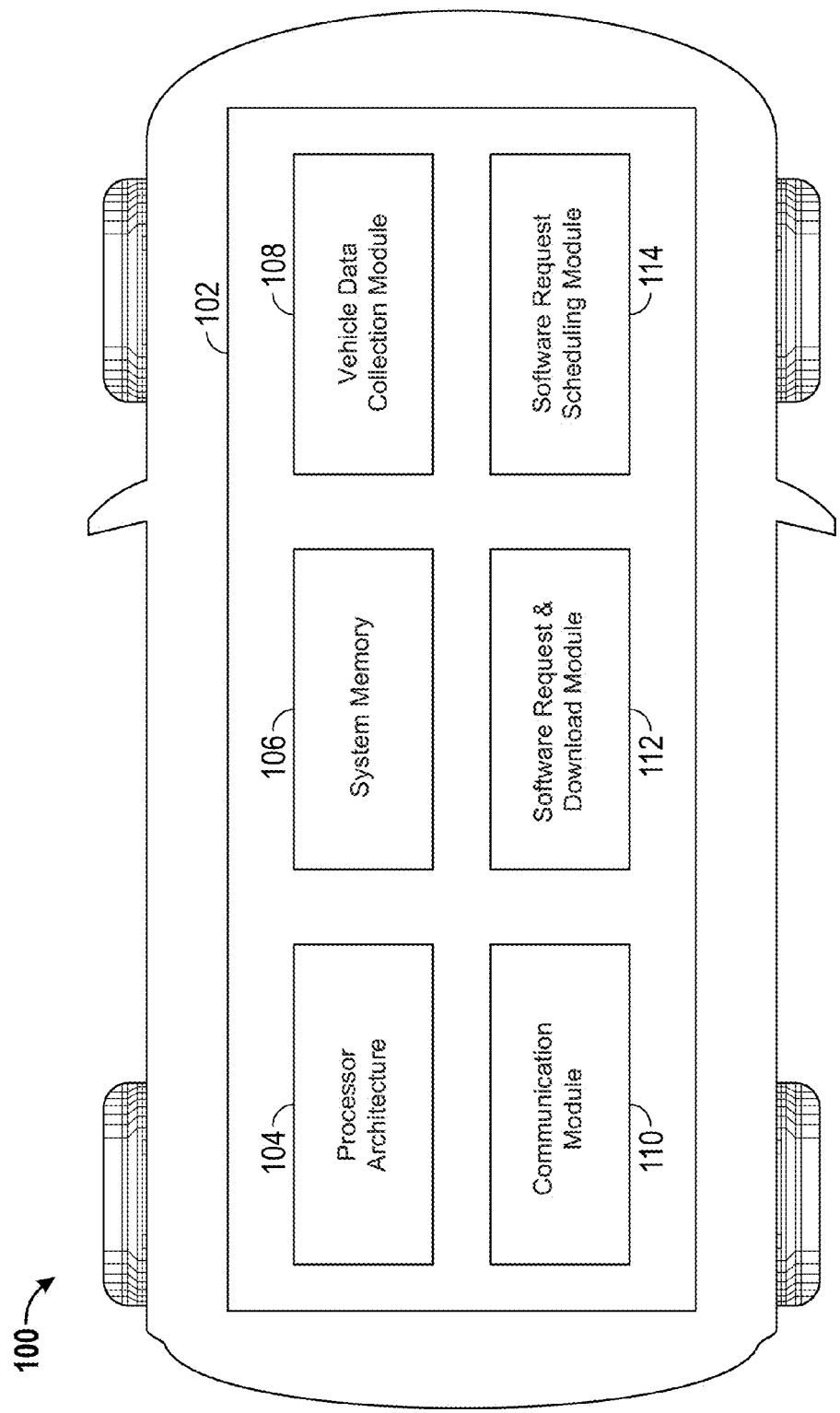
FIG. 1 is a functional block diagram of a vehicle that includes an onboard computer system, according to some embodiments.

Referring now to the drawings, FIG. 1 is a functional block diagram of a vehicle 100 that includes an onboard computer system 102, according to some embodiments. The onboard computer system 102 may be implemented using any number (including only one) of electronic control modules onboard the vehicle 100. In certain implementations, the features and functionality described herein are associated with the operation of one or more electronic control modules of the vehicle 100. The vehicle 100 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The onboard computer system 102 is configured to adjust the frequency at which software data is requested for download from a remote server, to request software data according to the determined frequency, and to download the appropriate software data at the appropriate time. The onboard computer system 102 may include, without limitation: a processor architecture 104, a system memory 106, a vehicle data collection module 108, a communication module 110, a software request and download module 112, and a software request scheduling module 114. These elements and features of an onboard computer system 102 may be operatively associated with one another, coupled to one another, or otherwise configured to cooperate with one another as needed to support the desired functionality—in particular, controlling the variable rate of requesting software downloads at the vehicle onboard computer system 102, as described herein. For ease of illustration and clarity, the various physical, electrical, and logical couplings and interconnections for these elements and features are not depicted in FIG. 1. Moreover, it should be appreciated that embodiments of the vehicle onboard computer system 102 will include other elements, modules, and features that cooperate to support the desired functionality. For simplicity, FIG. 1 only depicts certain elements that relate to the adjustment of a variable frequency of requests for software downloads. Techniques related to adjustment of this variable frequency are described in more detail below.

The processor architecture 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 104 may be realized as one or more microprocessors, controllers, microcontrollers, or state machines. Moreover, the processor architecture 104 may be implemented as a combination of computing devices, e.g., a combination of digital signal processors and microprocessors, a plurality of microprocessors, one or more microprocessors in conjunction with a digital signal processor core, or any other such configuration.

The system memory 106 may be realized using any number of devices, components, or modules, as appropriate to the embodiment. Moreover, the vehicle onboard computer system 102 could include system memory 106 integrated therein and/or system memory 106 operatively coupled thereto, as appropriate to the particular embodiment. In practice, the system memory 106 could be realized as RAM memory, flash memory, EPROM memory, EEPROM memory, registers, a hard disk, a removable disk, or any other form of storage medium known in the art. In certain embodiments, the system memory 106 includes a hard disk, which may also be used to support functions of the onboard computer system 102. The system memory 106 can be coupled to the processor architecture 104 such that the processor architecture 104 can read information from, and write information to, the system memory 106. In the alternative, the system memory 106 may be integral to the processor architecture 104. As an example, the processor architecture 104 and the system memory 106 may reside in a suitably designed application-specific integrated circuit (ASIC).

The vehicle data collection module 108 is suitably configured to collect and provide vehicle data to the onboard computer system 102. Vehicle data may be obtained or generated by any number of onboard sensors, instruments, or devices, as is well understood. Vehicle data may include factors affecting a variable rate of requesting software data from a remote server, including a number of ignition cycles executed since the last software download was performed by the vehicle onboard computer system 102, a time measurement (e.g., age of the vehicle and/or time elapsed since the last software download), an odometer reading, maintenance data, or the like. The vehicle data collection module 108 communicates with elements of the onboard computer system 102 to obtain and communicate requested information during configuration and/or adjustment of the scheduled frequency for requesting software data.

The communication module 110 is suitably configured to establish a connection and communicate data between the onboard computer system 102 and one or more remote servers. As described in more detail below, data received by the communication module 110 may include downloadable software data compatible with the onboard computer system 102, including software updates, revisions, corrections, and the like. Data provided by the communication module 110 may include, without limitation, requests to download software applications, and the like.

In certain embodiments, the communication module 110 utilizes a wireless local area network (WLAN) connection, a cellular telecommunication network, and/or a short-range wireless communication protocol to establish a connection with a remote server from which software data is downloaded. In some embodiments, the communication module 110 is implemented as an onboard vehicle communication or telematics system, such as an OnStar® module commercially marketed and sold by the OnStar® corporation, which is a subsidiary of the assignee of the instant Application, the General Motors Company, currently headquartered in Detroit, Mich. In embodiments wherein the communication module 110 is an OnStar® module, an internal transceiver may be capable of providing bi-directional mobile phone voice and data communication, implemented as Code Division Multiple Access (CDMA). In some embodiments, other 3G technologies may be used to implement the communication module 110, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, and the like. In some embodiments, 4G technologies may be used to implement the communication module 110, alone or in combination with 3G technologies, including without limitation: Evolved High Speed Packet Access (HSPA+), Long Term Evolution (LTE) and/or Long Term Evolution-Advanced (LTE-A).

The software request and download module 112 is suitably configured to inquire whether software data has become available for download, and to obtain the available software data for the vehicle onboard computer system 102. In certain embodiments, the downloadable software data comprises software update information applicable to one or more electronic control units (ECUs) in the vehicle 100. In other embodiments, the downloadable software data comprises software appropriate for enabling specific features of a vehicle onboard computer system 102, such as a downloadable software application and/or enhanced functionality associated with an already-existing vehicle 100 feature. For example, software may be downloaded to update a vehicle user guide, enable a new version of a cellular telephone to operate using a hands-free feature on a vehicle, etc.

Generally, software data for a vehicle onboard computer system 102 is obtained using a "pull" method. Utilizing this method, the vehicle onboard computer system 102 will submit requests directly to one or more remote servers in order to determine the availability of software data for download. These requests are communicated via a wireless communication connection (established by communication module 110).

The software request and download module 112 requests available software data for download to the vehicle onboard computer system 102 according to a scheduled frequency determined by the software request scheduling module 114. The software request scheduling module 114 is configured to determine and set a periodic frequency for requesting downloadable software data from one or more remote servers.

The default frequency at which a vehicle onboard computer system 102 sends a request to download available software data is predetermined, and this frequency is saved within system memory 106 for use throughout the life of a vehicle 100 and its associated onboard computer system 102. The software request scheduling module 114 adjusts this default frequency based on the age of the vehicle 100 and whether or not the vehicle onboard computer system 102 was recently updated. It should be appreciated that the software request scheduling module 114 may be further configured to modify the default polling frequency as needed based on other factors, criteria, metrics, or the like. Generally, the software request scheduling module 114, in communication with the vehicle data collection module 108, receives a data value indicating a number of ignition cycles executed within a specified period of time. In certain embodiments, the specified period of time includes the entire life of the vehicle 100. In this example, the frequency of requesting software download information is determined by the total number of ignition cycles executed during the lifetime of the vehicle, which is indicative of the age of the vehicle. In other embodiments, the age of the vehicle may be determined using an odometer reading, a time measurement, and/or maintenance data. In some embodiments, the specified period of time begins with the last software download that was performed by the vehicle onboard computer system 102 and ends at the present time. In this example, the frequency of requesting software download information is determined by the number of ignition cycles executed since the last software download was completed, which indicates the age of the latest software download.

In embodiments where the software downloads include software updates, a vehicle onboard computer system 102 requires more frequent software downloads when its currently existing software is "new". Existing software is considered "new" in either of two circumstances: (i) the vehicle itself is new, and therefore the entire software package being used in the onboard computer system 102 and/or ECUs is new; and (ii) immediately upon downloading new software or a software update to the vehicle onboard computer system 102. In each of these scenarios, the software being used by the vehicle 100 has very recently been created or changed, and errors, deficiencies, or "bugs" in the software may not yet have been discovered. As software issues present themselves, updates and corrections are developed and become available for download.

As a vehicle 100 ages and the majority of software usage problems are rectified, the vehicle 100 requires fewer software downloads in the form of software updates. However, the vehicle 100 still requests software downloads (in this case, updates) at the same predetermined or default frequency that was saved in system memory 106 and used in the beginning of the software life-cycle, when software updates were required on a more frequent basis. The software request scheduling module 114 adjusts (e.g., reduces) this frequency according to the age of the vehicle and/or the amount of time that has lapsed since a software update was performed.

Figure 2:
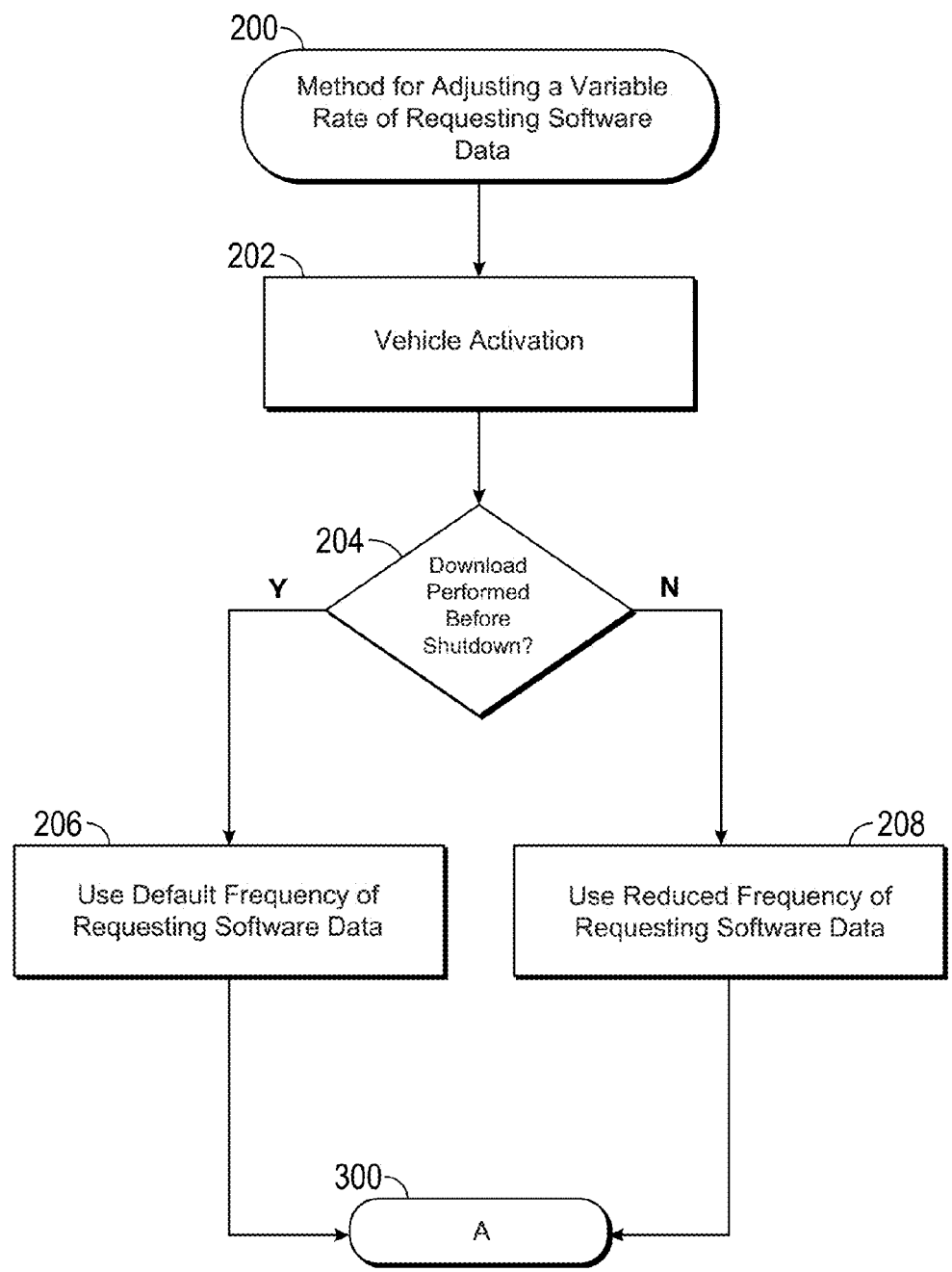
FIG. 2 is a flowchart that illustrates a method of adjusting a variable rate of requesting software data from a remote server, according to some embodiments.

FIG. 2 is a flowchart that illustrates an embodiment of a process 200 of adjusting a variable rate of requesting software data from a remote server. The various tasks performed in connection with process 200 described here may be performed by software, hardware, firmware, or any combination thereof. For illustrative purposes, the description of process 200 may refer to elements mentioned above in connection with FIG. 1. In practice, portions of a described process may be performed by different elements of the described system, e.g., the system firmware, logic within a vehicle onboard computer system, or other logic in the system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

For ease of description and clarity, this example assumes that the process 200 begins when a vehicle ignition cycle is executed (step 202), or in other words, when a vehicle is powered on and the engine is started. In certain embodiments, a vehicle ignition cycle may be executed using a key in an ignition, and in other embodiments, a push-button start or other ignition technique may be used. At this point, the process 200 initiates reading an internal ignition cycle counter, which is used to track the number of ignition cycles that have been executed since the last software download for the vehicle has been performed. In other embodiments, the process 200 initiates reading an internal clock, odometer, or other sensor apparatus to obtain pertinent vehicle data.

Figure 3:
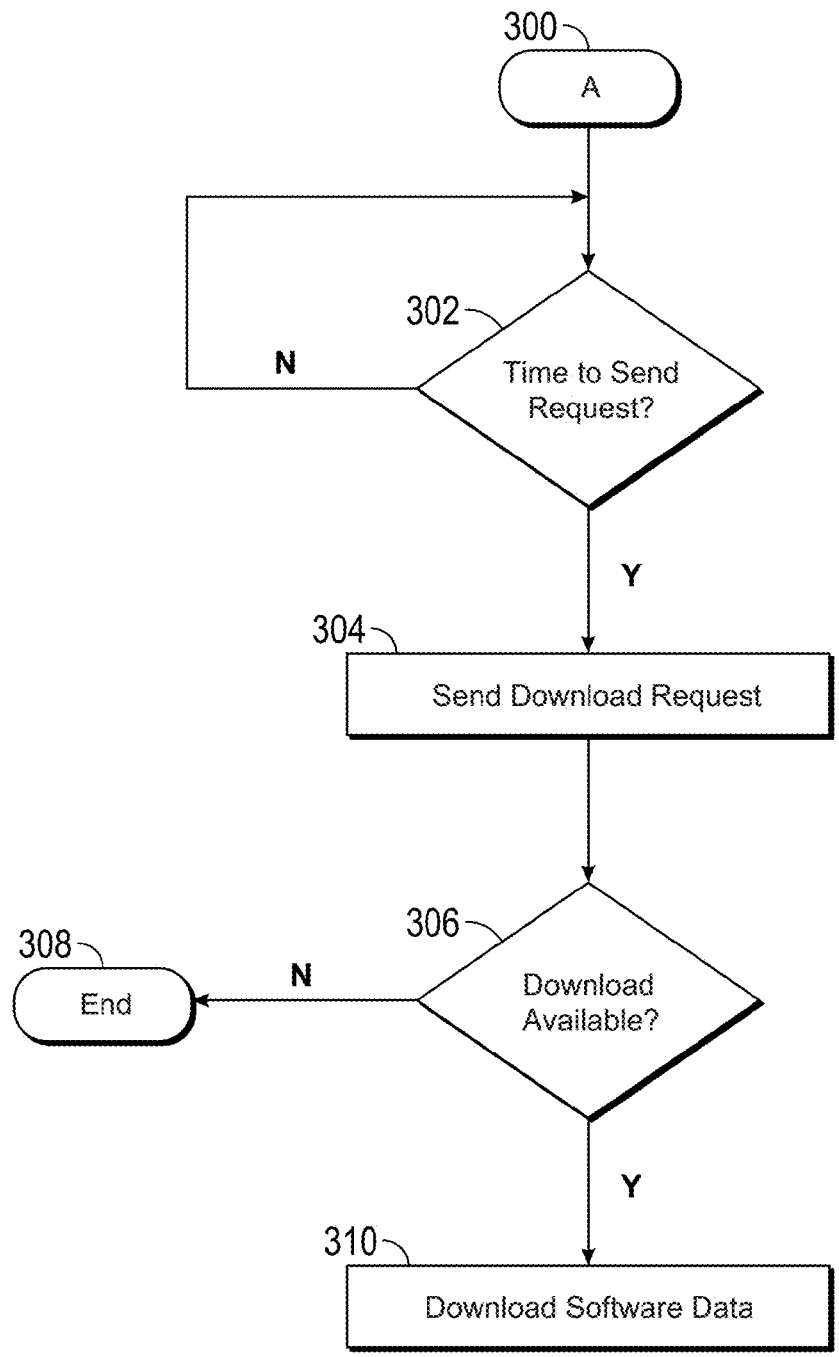
FIG. 3 is a flowchart that illustrates requesting a software download using a determined request frequency, according to some embodiments.

The ignition cycle counter operates by being reset (i.e., set to zero) every time software data is downloaded, which may occur at the end of process 300 (shown in FIG. 3). At the beginning of process 200, when the ignition cycle is executed, the ignition cycle counter is retrieved, for purposes of determining when the last software download was performed. If software data has been downloaded during the last ignition cycle, then the ignition cycle counter has been reset to zero, and process 200 initiates reading the zero-value. Once the ignition cycle counter is read, it is incremented, to "count" the current ignition cycle that has just been executed.

The process 200 determines whether a software download was performed before the vehicle was shut-down (step 204) during the last ignition cycle by comparing the current ignition cycle counter value to a threshold value. In certain embodiments, the threshold value is set to two, and an ignition cycle counter reflects a recent software download (e.g., the counter was reset to zero) and a newly executed ignition cycle (e.g., the zero-value was incremented to equal one). In this example, the ignition cycle counter value is equal to one, which is less than the threshold value of two. When the ignition cycle counter value is less than the threshold value, then a software download is determined to have been performed before the vehicle was shut-down (the "Yes" branch of 204), and the process 200 uses a default frequency for requesting software data (step 206).

The frequency of requesting software data may be defined as the number of times, within a specified time period, that software data is requested for download from a remote server by a vehicle onboard computer system. The specified time period is defined and saved within system memory for use by the process 200. A default frequency may be any frequency considered to be "normal" for a newer vehicle or a vehicle onboard computer system that has recently downloaded new software and/or software updates. Generally, a newer vehicle or a vehicle that has recently updated its software will require more frequent updating, due to an increased likelihood of errors or "bugs" in the vehicle software that require correction. Thus, using a default frequency, a vehicle onboard computer system would request software data for download often.

When the ignition cycle counter value is greater than a threshold value, then it is determined that a software download was not performed before the vehicle was shut-down (the "No" branch of 204), and the process 200 uses a reduced frequency of software data requests (step 208). A reduced frequency may be any frequency considered to be "normal" for an older vehicle or a vehicle onboard computer system that has not recently downloaded new software and/or software updates. Generally, an older vehicle or a vehicle that has not recently updated its software will not require frequent updating, due to the decreased likelihood of errors in the vehicle software that require correction. In other words, the longer the vehicle software has been in use, the more likely it is that any errors in the software have already been corrected. Thus, using a reduced frequency, a vehicle onboard computer system would not request software data for download as often as with the default frequency.

After the appropriate frequency for requesting software downloads has been determined, the process 200 goes on to request a software download using a determined request frequency (process 300, shown in FIG. 3). First, the process 300 determines whether it is time to send a request for software data (step 302) according to the appropriate frequency. The appropriate frequency is determined using process 200 (shown in FIG. 2). If it is not time to send a request for software data (the "No" branch of 302), then the process 300 returns to the beginning of process 300 and continues to monitor whether it is time to send a request for software data (step 302). The process 300 moves to the next step when it is appropriate to send a request for software data.

If it is time to send a request for software data (the "Yes" branch of 302), then the process 300 initiates a request for software data (step 304) according to the default or adjusted frequency, and determines whether a software download is available (step 306). Generally, software data is available for download when a new version or update has been released and designated as available for download at a remote server. In certain embodiments, software data may be associated with a paid feature of the vehicle, which becomes available for download once the purchase is made. In some embodiments, software data may be associated with a permission-based feature of the vehicle, which becomes available for download once permission has been granted.

If a software download is currently available for download (the "Yes" branch of 306), then the software is downloaded (step 310). At this point, the internal ignition cycle counter is reset (i.e., set to zero), so that the number of recognized ignition cycles since the last software download is accurate. At this point, the process 300 ends until the vehicle is shut-down and another ignition cycles is executed to start the vehicle. Once the new ignition cycle is executed, the process 200 (shown in FIG. 2) begins again.

If software data is not currently available for download (the "No" branch of 306), then the process ends (step 308) until the vehicle is shut-down, and another ignition cycle is executed. The ignition cycle counter retains its value, and when the new ignition cycle is executed, the counter will be incremented again.

Figure 4:
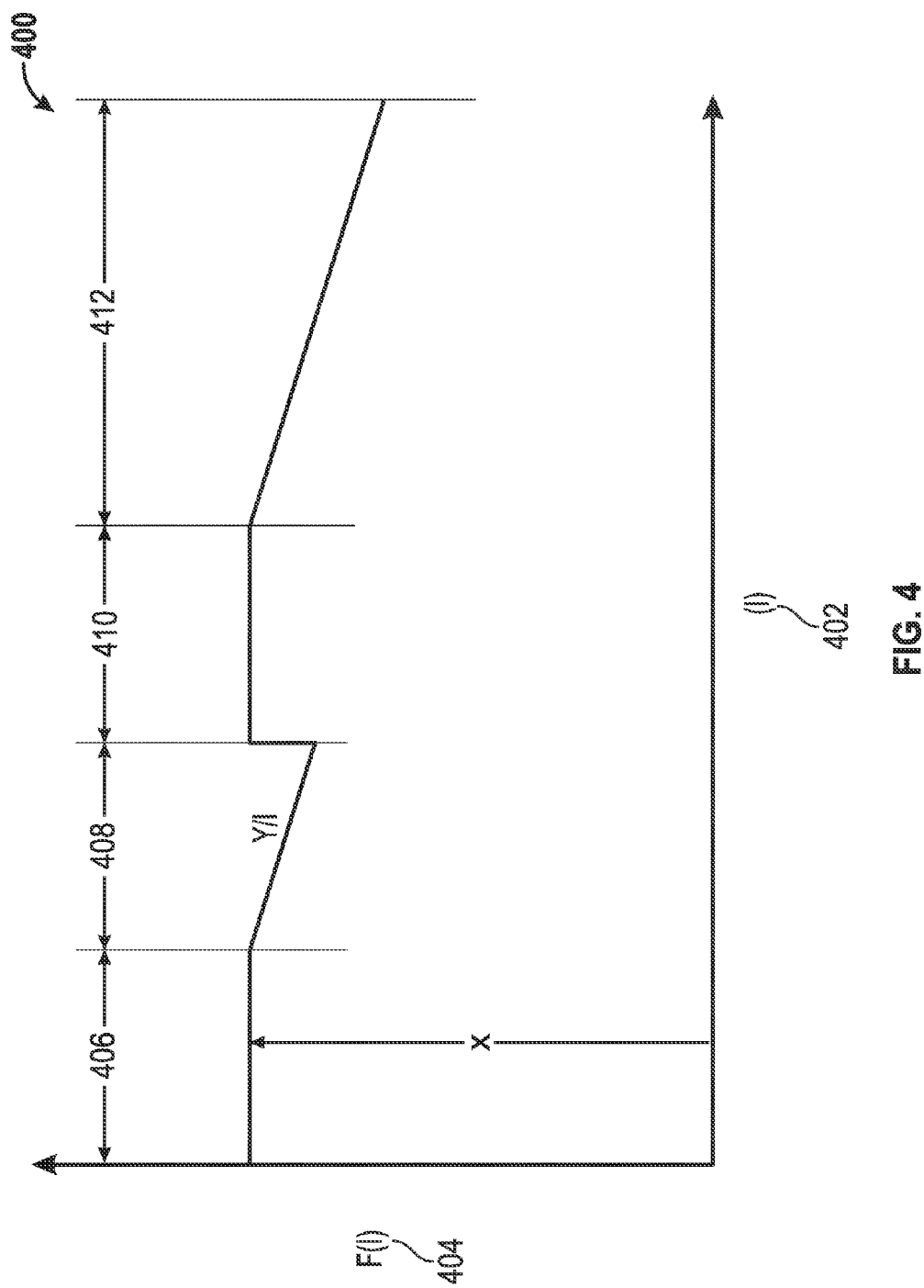
FIG. 4 depicts a plot of the number of ignition cycles executed since the last software download versus the number of requests for software data per hour, according to some embodiments.

FIG. 4 depicts a plot 400 of the number of ignition cycles executed since the last software download 402 versus the number of requests for software data per period 404, according to some embodiments. In certain embodiments, once a software download has been completed at a vehicle, an internal counter is reset (i.e., set to zero). The internal counter is noted in plot 400 as "I". Upon execution of the next ignition cycle, and every ignition cycle thereafter that does not immediately follow a software download, the internal counter is incremented (I=I+1). The current value of the internal counter (I) reflects the number of ignition cycles executed since the last software download 402.

As described previously, in relation to FIGS. 1-3, software data is requested from a remote server periodically for download at a vehicle onboard computer system. The time period used in plot 400 is arbitrary, and is chosen and set within system memory of the onboard computer system before execution of the process (shown as 200 in FIG. 2). This preset time period provides a time metric for which the number of requests to download software data may be reduced when a condition is met. In certain embodiments, when the number of ignition cycles executed since the last software download (I) 402 is less than a predetermined threshold value, then the number of download requests per period is a default frequency value, which is represented by a constant x-value. For example, if the threshold value is set to two, and the number of ignition cycles executed since the last software download (I) 402 is one (e.g., the current ignition cycle that initiated the process), then the number of requests for software per period (F(I)) 404 is also one. In this example, the vehicle onboard computer system will request updated software data for download at a rate of one request per period (F(I)) 404. Plot sections 406 and 410 illustrate this principle.

In other embodiments, when the number of ignition cycles executed since the last software download (I) 402 is greater than a predetermined threshold value, then the number of download requests per period is equal to a y-value divided by the internal counter value (I). For example, when the threshold value is set to two, and the number of ignition cycles executed since the last software download (I) 402 is three, then the number of requests for software per period (F(I)) 404 is the y-value divided by the internal counter value (I), or the number of software requests per period 404 divided by the number of ignition cycles since the last software download 402 (F(I)/I). Here, the number of requests for software per period (F(I)) 404 continues to decrease as the internal counter value (I) increases, producing a linear decline in the graph. Plot sections 408 and 412 illustrate this principle.

In some embodiments, when the number of requests for software per period (F(I)) 404 linearly declines past a predetermined low threshold, then the number of requests for software per period (F(I)) 404 is equal to zero. Generally, as the number of ignition cycles since the last software download (I) 402 increases, the likelihood of further required software downloads decreases. Further to this concept, as the number of ignition cycles since the last software download (I) 402 increases, the Y/I value continues to decrease. Once the Y/I value has decreased to a point below a predetermined low threshold point, then the vehicle is presumed to require software updates no longer, and the number of requests for software per period (F(I)) 404 is set to zero. In other words, as a vehicle ages, fewer software downloads may be required for updating purposes, and as fewer software updates are downloaded, the vehicle will request additional updates at a continually decreasing rate (e.g., Y/I). Once the Y/I value falls below the predetermined low threshold point, the vehicle will not request software updates again. For example, a 1981 Chevrolet Chevette does not require software downloads (for updating purposes or otherwise). Because software is no longer being developed to accommodate older vehicles, such as the 1981 Chevette, it is no longer necessary to request software downloads from the remote server.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for adjusting a variable rate of requesting software data for a computer system onboard a vehicle, the method comprising:
   maintaining, by the computer system onboard the vehicle, an update request frequency that controls a number of times a software update request is generated within a specified time period;
   maintaining, by an ignition cycle counter, count of a number of ignition cycles of the vehicle. the maintaining comprising:
      resetting the number to zero when a software download is performed in the previous ignition cycle; and
      incrementing the number of ignition cycles every time the ignition counter is read;
   identifying, from the ignition cycle counter, the number of ignition cycles; and
   when the identified number of ignition cycles is greater than a threshold value,
      determining a value based on the age of the vehicle, the identified number of ignition cycles, a time elapsed since a last software update, and an odometer reading;
      calculating a reduced frequency based on the determined value; and
      setting the update request frequency equal to the calculated reduced frequency.

2. The method of claim 1, further comprising:
   performing the software download by retrieving first software data from a remote server;
   wherein the retrieving of the first software data comprises downloading a software update from the remote server.

3. The method of claim 1, further comprising:
when the number of ignition cycles is less than or equal to the threshold value, utilizing a default frequency for generating the software update request.

4. The method of claim 1, further comprising:
reading an ignition cycle counter value to determine the number of ignition cycles executed after the software download is performed;
incrementing the ignition cycle counter value in response to ignition of the vehicle; and
comparing the incremented ignition cycle counter value to the threshold value.

5. The method of claim 4, further comprising:
determining whether second software data is available by requesting the second software data according to the calculated reduced frequency; and
when the second software data is available,
retrieving the second software data;
incorporating the second software data into the computer system onboard the vehicle; and
resetting the number to zero.

6. The method of claim 5, wherein the step of resetting the number to zero further comprises initiating use of a default frequency for generating the software update request.

7. The method of claim 5, further comprising:
obtaining the second software data from a remote server, using a wireless communication protocol.

8. The method of claim 5, further comprising:
obtaining the second software data from a remote server, using a local area network (LAN) connection.

9. A system for adjusting a variable rate of requesting software updates onboard a vehicle, the system comprising:
a vehicle onboard communication system, communicatively coupled to a vehicle onboard computer system and a remote server from which software data is downloaded, the vehicle onboard communication system configured to request and receive software updates for the vehicle onboard computer system;
the vehicle onboard computer system, comprising:
system memory; and
at least one processor communicatively coupled to the system memory that:
maintains an update request frequency that controls a number of times a software update request is generated within a specified time period;
maintains, by an ignition cycle counter, count of a number of ignition cycle of the vehicle, the maintaining comprising:
resetting the number to zero when a software download is prefofmed in the previous ignition cycle:and
incrementing the number of ignition cycles every time the ignition counter is read:
identifies, from the ignition cycle counter, the number of ignition cycles; and
when the identified number of ignition cycles is greater than a threshold value,
determines a value based on the age of the vehicle, the identified number of ignition cycles, a time elapsed since a last software update, and an odometer reading;
calculates a reduced frequency based on the determined value; and
sets the update request frequency equal to the calculated reduced frequency.

10. The system of claim 9, wherein the at least one processor is further configured to:
utilize a default frequency for requesting software updates when the number of ignition cycles is less than or equal to the threshold value, wherein the update request frequency comprises the default frequency.

11. The system of claim 9, wherein the at least one processor is further configured to:
read the count of the ignition cycle counter to determine the number of ignition cycles executed after the software download is performed;
increment the count in response to the vehicle onboard computer system being powered-on; and
compare the incremented count to the threshold value.

12. The system of claim 11, wherein the at least one processor is further configured to:
determine whether a second software update is available by requesting the second software update according to the reduced frequency; and
when the second software update is available,
retrieve the second software update;
incorporate the second software update into the onboard computer system; and
reset the count.

13. The system of claim 12, wherein, when the second software update is needed, the at least one processor is further configured to:
initiate use of default frequency for requesting software updates, wherein the update request frequency comprises the default frequency.

14. The system of claim 12, wherein the vehicle onboard communication system is further configured to obtain the second software update from a remote server, using a wireless communication protocol.

15. The system of claim 12, wherein the vehicle onboard communication system is further configured to obtain the second software update from a remote server, using a local area network (LAN) connection.

16. A non-transitory, computer-readable storage medium containing instructions stored thereon, wherein, when executed by a processor, the instructions cause the processor to perform a method for adjusting a variable rate of vehicle onboard requests for software updates, the method comprising:
maintaining by a computer system onboard the vehicle, an update request frequency that controls a number of times a software update request is generated within a specified time period;
maintaining, by an ignition cycle counter, count of a number of ignition cycles of the vehicle, the maintaining comprising;
resetting the number to zero when a software download is performed in a previous ignition cycle; and
incrementing the number of ignition cycles every time the ignition counter is read;
identifying, from the ignition cycle counter, the number of ignition cycles; and
when the identified number of ignition cycles is greater than a threshold value,
determining a value based on an age of the vehicle, the identified number of ignition cycles, a time elapsed since a last software update, and an odometer reading;
calculating a reduced frequency based on the determined value; and
setting the update request frequency equal to the calculated reduced frequency.

17. The non-transitory, computer-readable storage medium of claim 16, wherein the method performed by the instructions further comprises:

utilizing the update request frequency comprising the default frequency when the vehicle onboard software update was performed before the vehicle was shut down;

wherein the default frequency comprises a constant periodic rate of requesting software updates.

18. The non-transitory, computer-readable storage medium of claim 16, wherein the method performed by the instructions further comprises:

obtaining a second software update from a remote server, using a wireless communication protocol.

19. The non-transitory, computer-readable storage medium of claim 16, wherein the method performed by the instructions further comprises:

reading an ignition cycle counter value to determine a number of ignition cycles executed after the software download is performed;

incrementing the ignition cycle counter value; and comparing the ignition cycle counter value to the threshold value.

20. The non-transitory, computer-readable storage medium of claim 19, wherein the method performed by the instructions further comprises:

determining whether a second software update is needed by requesting the second software update according to the reduced frequency; and when the second software update is needed,
retrieve the second software update;
incorporate the second software update into a computer system onboard the vehicle; and
reset the number to zero.

\* \* \* \* \*